April 23, 1935. W. P. RUSS 1,998,844
INTERNAL COMBUSTION ENGINE AND METHOD OF SUPERCHARGING SAME
Filed Aug. 29, 1931 3 Sheets-Sheet 1

INVENTOR.
Walter P. Russ
BY Lancaster, Allwine & Rommel
ATTORNEYS.

April 23, 1935.  W. P. RUSS  1,998,844

INTERNAL COMBUSTION ENGINE AND METHOD OF SUPERCHARGING SAME

Filed Aug. 29, 1931  3 Sheets-Sheet 2

INVENTOR.
Walter P. Russ

BY
Lancaster, Allwine and Rommel
ATTORNEYS.

April 23, 1935.  W. P. RUSS  1,998,844
INTERNAL COMBUSTION ENGINE AND METHOD OF SUPERCHARGING SAME
Filed Aug. 29, 1931  3 Sheets-Sheet 3
FIG. 3.
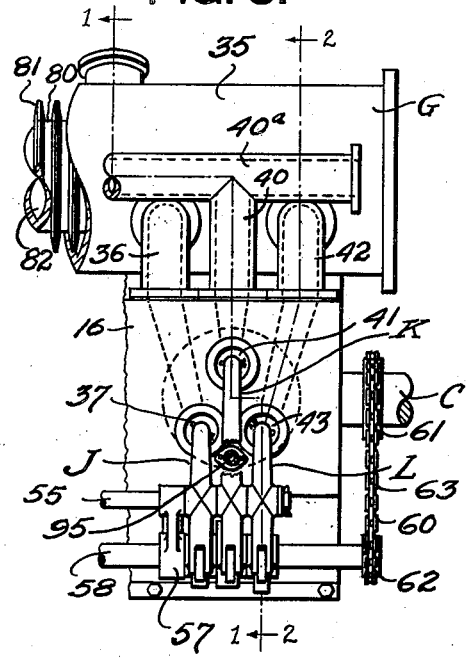
FIG. 4.
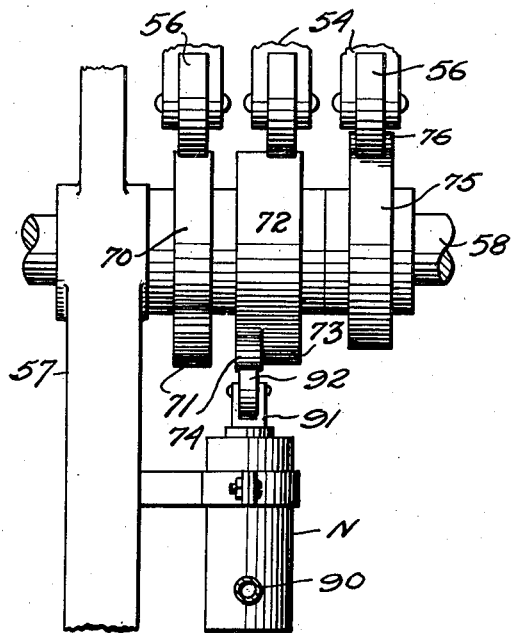
FIG. 5.
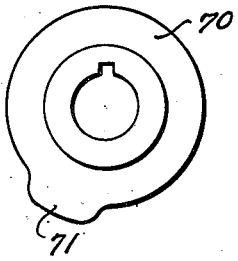
FIG. 6.
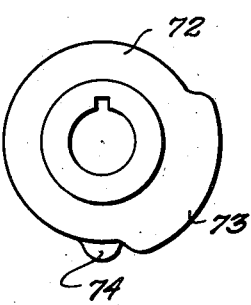
FIG. 7.
FIG. 8.
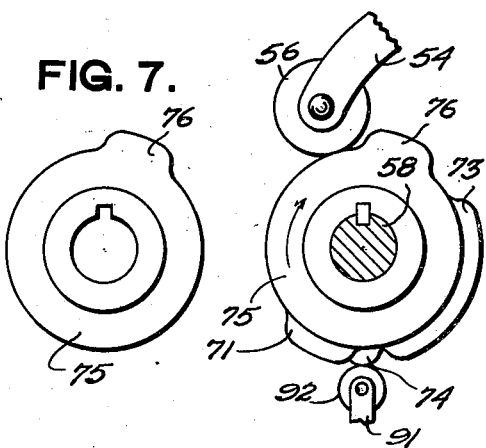
INVENTOR.
Walter P. Russ
BY Lancaster, Allwine and Rommel
ATTORNEYS.

Patented Apr. 23, 1935

1,998,844

UNITED STATES PATENT OFFICE 1,998,844

INTERNAL COMBUSTION ENGINE AND METHOD OF SUPERCHARGING SAME

Walter P. Russ, Tampa, Fla.

Application August 29, 1931, Serial No. 560,179

14 Claims. (Cl. 123—75)

The present invention relates to internal combustion engines and more particularly to improvements in the construction thereof whereby the engines may be supercharged prior to ignition of the fuels, to the method of supercharging such engines, and to such engines which may be used to accumulate heated fluid under superatmospheric pressure for use in the operation of other engines or units as pumps, compressors, blowers, turbines, etc.

One of the principal objects of the invention is to provide internal combustion engines which are of a "four stroke to a cycle of operation" type, with a power stroke to each two revolutions of the crank shaft as in the ordinary four cycle engine but are supercharged by utilizing two of the strokes of each cycle for compression whereby to supercharge the engine or supply fluid under pressure for other uses.

By this construction the power piston assists directly in supercharging or in supplying fluid under superatmospheric pressure, in contradistinction to crank shaft driven compressors associated with internal combustion engines. The invention contemplates a construction using the combined power and exhaust stroke as in an ordinary two cycle engine and whereby the power piston may be used to assist in scavenging the cylinder in the ordinary or approved manner, by sucking in air during the compression stroke and forcing such air to traverse the piston head at the end of the power stroke and what, in the present case, may be aptly termed an intake or suction stroke, intermediate compression strokes.

Another object of the invention is to provide internal combustion engines which may be supercharged and which embody but few working parts thereby increasing the efficiency of the engine and reducing the cost of maintenance.

A further object of the invention is to provide means whereby supercharging is carried on continuously without the aid of any outside mechanism, such as pumps, air compressors, blowers, or turbine compressors.

A further object is to provide a simple means whereby compressed air can be obtained from the cylinders of internal combustion engines of the four cycle type to be used for pneumatic power purposes, such as pneumatic driven locomotives, hoisting engines, mine pumps, pneumatic cylinders and turbines.

A further object of the invention is to provide a method whereby the efficiency of internal combustion engines of the four stroke to the cycle type may be increased.

Other objects and advantages of the invention will appear in the following detailed description, taken in connection with the accompanying drawings, forming a part of this specification and in which drawings:—

Figure 3 is a fragmentary view in plan of the engine, or one unit of a multi-cylinder engine.

Figure 4 is a detail view in elevation of cams and associated parts for operating valves.

Figures 5, 6 and 7 are face views of cams showing the throws thereof.

Figure 8 is a fragmentary detail view showing the cams illustrated by Figures 5, 6 and 7 in assembled relation on a cam shaft, and the relative position of parts actuated by the throws of the cams.

Figure 1:
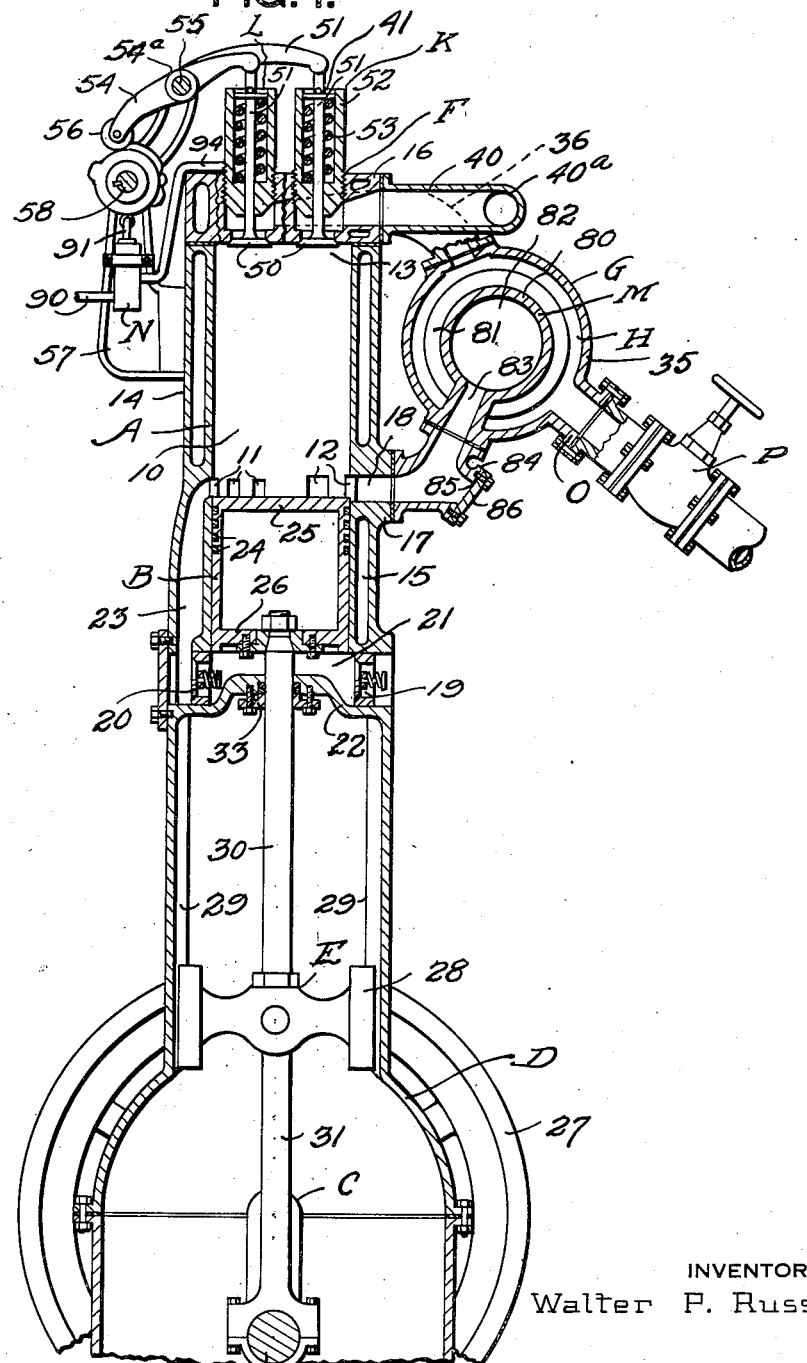
Figure 1 is a view partly in central vertical section and partly in elevation of an internal combustion engine constructed according to the present invention.
Figure 2:
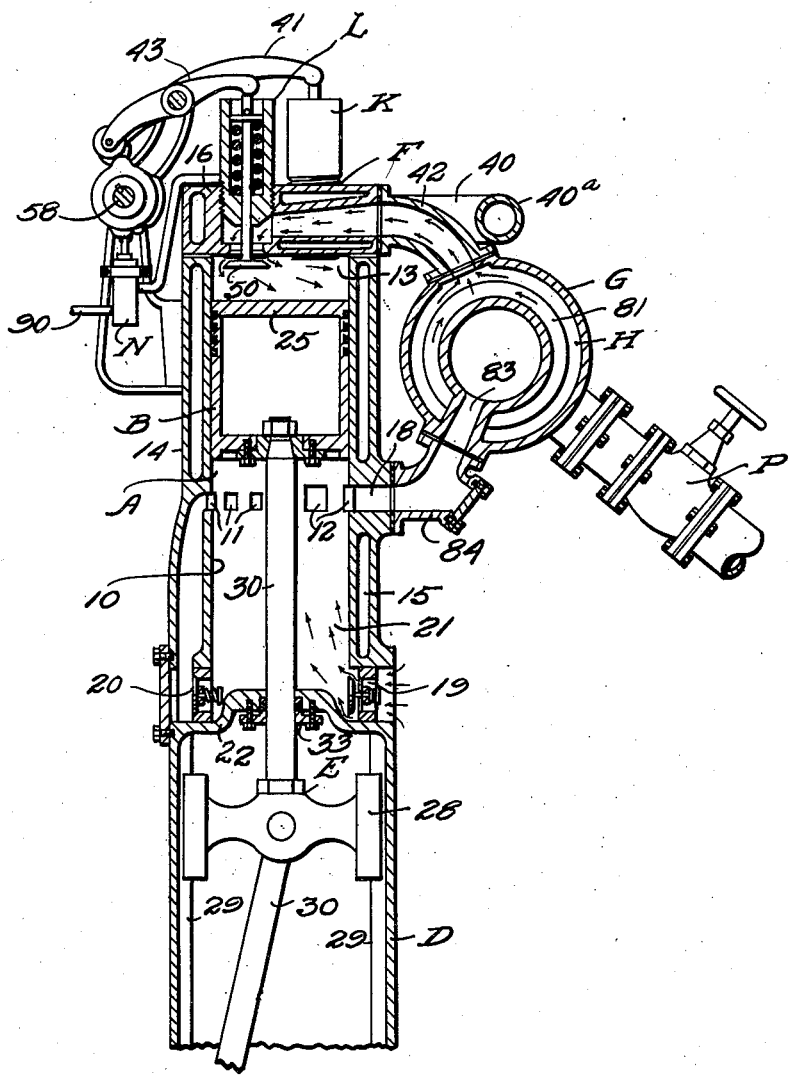
Figure 2 is a similar fragmentary view showing the parts in a different position.
Figure 9:
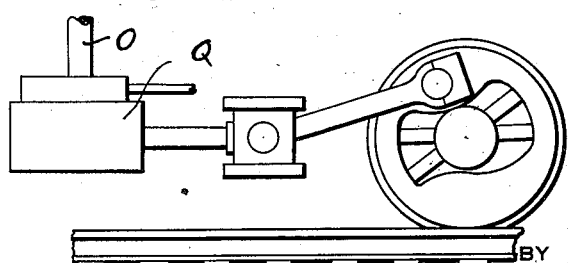
Figure 9 is a fragmentary view in elevation of a locomotive engine which may be operated by air compressed by the engine constructed according to the present invention.

In the drawings, where like characters designate like parts thruout the views, A designates the engine cylinder; B a piston reciprocable therein; C a crank shaft supported in housing D; E motion transmitting means between piston A and shaft C to rotate the latter by reciprocation of the former; F supercharging means for the engine, including means G providing an accumulating chamber H; means J for transfer and control of fluid between the cylinder A and chamber H and in the example shown for movement of the fluid from the cylinder to the chamber; means K for transfer and control of fluid between the atmosphere and the cylinder and in the example shown to supply air to the cylinder during a suction stroke of the piston, and means L for transfer and control of fluid between the cylinder A and chamber H, and in the example shown for movement of compressed air from the latter to the former; M a heater for the fluid in chamber H; N fuel supply means; and O a way for exit of fluid from chamber H, controlled by valve P, and which may be provided for operation of an engine Q, such as is shown in Figure 9.

The engine cylinder provides a bore 10 in which piston B reciprocates and intermediate the ends of the bore are provided scavenging ports 11 and exhaust ports 12 to be uncovered by the piston B as it approaches the end of its stroke away from firing chamber 13. Ports 12 are longer, longitudinally of the cylinder than ports 11, so that the cylinder is opened for exhaust of the waste products of combustion prior to opening of the scavenging ports.

The cylinder may be jacketed as at 14 to provide spaces 15 for the circulation of a cooling medium, such as water. The supercharging means F preferably has connection with cylinder head 16 and a lateral projection 17 containing a manifold port 18 communicating with exhaust ports 12. In the example shown, the scavenging fluid is caused to traverse the head of piston B by the provision of check valves 19 and 20, a chamber 21, provided by partition 22, which may form a part of the housing D, and a port 23 affording communication between chamber 21 and ports 11. Check valve 19 permits entrance of air to chamber 21 but prevents back flow of air. Check valve 20 permits egress of air from the chamber to port 23 but prevents air from being sucked from said port into the chamber whenever piston B moves toward firing chamber 13.

Piston B may be provided with a plurality of piston rings 24 adjacent its head 25. Opposite head 25 is a partition 26 which assists in compressing air in chamber 21.

A crank shaft C of ordinary or approved type may be used, supported by housing D and provided with a fly wheel 27.

In the example shown, the motion transmitting means E comprises a cross head 28, guided in its reciprocation on slides 29 carried by housing D; a connecting rod 30 operatively connected to partition 26 of piston B at one end, and at its other end to cross head E; and, a connecting rod 31 operatively connected at one end to cross head 28 and at its other end to the crank portion 32 of shaft C. The connecting rod 30 extends thru partition 22, there being provided a suitable packing 33 to prevent escape of compressed air in chamber 21 about the connecting rod.

Referring now to the supercharging means and more particularly the reservoir for storing compressed air, that is, air under superatmospheric pressure, the means G comprises what may be termed a closed cylinder or compartment 35 providing accumulating chamber H. However, if the engine is equipped to supply compressed air for the operation of another engine or unit way O may be opened by manipulation of valve P.

Means J for transfer and control of fluid between cylinder A and chamber H comprises a conduit 36, in the example shown, connected to cylinder head 16 and cylinder 35, affording a passageway between the chamber H and firing chamber 13, and valve mechanism 37 to permit discharge of air compressed by piston B into chamber H, but to prevent back flow of such compressed air thru conduit 36.

Means K comprises a conduit 40 which, in the example shown has one end connected to a manifold 40ª and which may be connected to any suitable air cleaner, not shown in the drawings, and its other end to cylinder head 16 to provide a passageway open to the firing chamber 13, but controlled by valve mechanism 41 which permits inflow of air to the cylinder during the suction stroke but prevents the escape of compressed air during the compression strokes. Means L comprises a conduit 42 having its one end portion connected to cylinder 35 and open to chamber H, and its other end portion connected to cylinder head 16 to communicate with firing chamber 13, but which passageway is controlled by valve mechanism 43 of a character to open communication between the chambers H and 13 during a second compression stroke of the engine thereby permitting air under superatmospheric pressure to flow back to the engine cylinder from chamber H, this valve mechanism 43 preventing escape of air from the chamber during the suction stroke of the engine.

Each valve mechanism 37, 41 and 43 may comprise a valve 50 provided with a stem 51, slidable in a housing 52 containing a coil spring 53, normally seating the valve, and a cam operated rocker arm 54, pivoted as at 54ª on shaft 55, the one end portion of the rocker arm engaging valve stem 51 and the other end portion provided with a roller 56 for engagement with its respective cam. Shaft 55 may be supported on a bracket 57 which also supports cam shaft 58. This cam shaft may be operated from the crank shaft C thru suitable motion transmitting means 60, in the example shown comprising a sprocket wheel 61 on crank shaft C, and a sprocket wheel 62 on cam shaft 58 there being an endless chain 63 operatively trained about sprocket wheels 61 and 62. This motion transmitting means 60 is of a character to impart one revolution to the cam shaft upon two revolutions of the crank shaft.

Valve mechanism 37 includes a cam 70 mounted on shaft 58 and provided with a throw 71. Valve mechanism 41 includes a cam 72 provided with a throw 73 for operating valve 50 of such mechanism and also a throw 74 associated with fuel supply means N. Valve mechanism 43 includes a cam 75 provided with a throw 76. The throw 73 of cam 72 is considerably longer than the throws 71 and 76. These cams 70, 72 and 75 are arranged on cam shaft 58 to take the positions shown in Figure 8. The direction of rotation of the cam shaft is indicated by arrow. This is the position at the start of the combined power and exhaust stroke. During a quarter turn of the cam shaft none of the valves 50 are opened, the exhaust of the waste products of combustion being thru ports 12. As the cam shaft continues to rotate thru the next quarter turn the throw 71 of cam 70 will contact the roller 56 of rocker arm 54, of valve mechanism 37 and afford communication between the firing and accumulating chambers 13 and H, respectively thereby transferring compressed air to the latter. During the next stroke of the piston, the throw 73 of cam 72 acts upon roller 56 of rocker arm 54, of valve mechanism 41, thereby affording communication between the atmosphere and firing chamber 13 so that fresh air may be drawn into the cylinder thruout substantially all of the suction stroke of the piston and to remain open thru a portion of the compression stroke, such as until the piston closes exhaust ports 12. During the fourth quarter turn of the crank shaft, the throw 76 of cam 75 acts upon roller 56 of rocker arm 54, of valve mechanism 43 affording communication between the chambers M and 13, thus permitting air under superatmospheric pressure to return from the former to the latter. It will be observed that the throw 76 is of such a length as to not open communication between the chambers thruout the entire compression stroke but may be of a length to open such communication only at the time, or shortly before the pressure in the cylinder is approximately that of the pressure in chamber H. It is to be observed, however, that this inflow of air under superatmospheric pressure is heated air, the heating, in the example shown, being accomplished by heater M. It comprises a pipe 80, provided with external flanges 81, to facilitate heat transfer, this pipe providing a way 82 for waste products of combustion of the engine. Way 82 has communication with exhaust manifold port 13 thru port 43, and an elbow fitting 84, provided with a clean out opening 85 closed by cover 86.

The fuel supply means N comprises a pump, such as of the reciprocating type, the plunger 91 of which is provided with a roller 92 for engagement with the throw 74 of cam 72, the pump having an inlet pipe 90 and an outlet pipe 94 communicating with a nozzle 95, thru which fuel may be injected into the cylinder at the proper moment, such as at substantially the completion of the second compression stroke.

In the event it is desired to use air under superatmospheric pressure, heated by heater M for the purpose of operating another engine or unit, such as that shown at Q, valve P may be opened and the engine operated as previously described, with the exception that if air from chamber H is being used in this manner, the engine is not supercharged during such periods of use. However, if air is not being drawn from chamber H for such outside use, it is then used for supercharging purposes. Under certain circumstances, the means L may be dispensed with, and means J function to control both discharge of compressed air from cylinder A to chamber H and return of compressed air under superatmospheric pressure to the cylinder, by providing both throws 71 and 76 on cam 70, as is obvious from an inspection of the drawings.

However, there are a number of advantages resulting from the use of separate discharge, suction and supercharging valves forming a part of means J, K and L, and particularly a separate valve for controlling the passage of compressed gases from the firing chamber 13 to the accumulating chamber H and a separate valve for controlling passage of gases from the accumulating chamber H to the firing chamber 13. Among these advantages may be mentioned, first, wear on the cams and valve mechanism is reduced to a minimum, in contradistinction to the use of a single valve for controlling egress from and ingress to the firing chamber with two throws on a single cam unit, and, second, a turbulence is created in the accumulating chamber by the separate passageways for ingress of gases to and egress of gases from the accumulating chamber H as by separate means J and L, thus promoting heat exchange or absorption of heat units by the circulating gases.

Other changes in details and arrangements of parts may be resorted to without departing from the spirit of the invention which includes the method of supercharging an internal combustion engine by storing under pressure from a compression stroke of the engine intermediate power and intake strokes, and heating compressed fluid so that it may be introduced into the combustion chamber of the engine during the second compression stroke of a cycle of operation.

I claim:

1. In an internal combustion engine including a cylinder and a piston reciprocable therein, means for controlling communication between the cylinder and the atmosphere to provide for, in a four-stroke cycle of operation in succession, a first compression stroke; an intake stroke; a second compression stroke; and a combined power and exhaust stroke, compressed fluid of the first compression stroke being introduced into the cylinder during the second compression stroke.

2. In an internal combustion engine including a cylinder and a piston reciprocable therein, means for controlling communication between the cylinder and the atmosphere to provide for, in a four-stroke cycle of operation in succession, a first compression stroke; an intake stroke; a second compression stroke, a combined power and exhaust stroke, and means to introduce a combustible fuel into the firing chamber of the cylinder at substantially the completion of said second compression stroke.

3. In an internal combustion engine including a cylinder and a piston reciprocable therein, means for controlling communication between the cylinder and the atmosphere to provide for, in a four-stroke cycle of operation in succession, a first compression stroke; an intake stroke; a second compression stroke; a combined power and exhaust stroke, compressed fluid of the first compression stroke being introduced into the cylinder during the second compression stroke, and means to introduce a combustible fuel into the firing chamber of the cylinder at substantially the completion of said second compression stroke.

4. An internal combustion engine including a cylinder providing a firing chamber; a piston reciprocable therein; separate discharge, suction and supercharging valves for control of egress from and ingress to the firing chamber; means providing an accumulating chamber for fluid under superatmospheric pressure; means providing separate ways between the firing and accumulating chambers in which said discharge and supercharging valves are located and a way in communication with the atmosphere and said firing chamber in which said suction valve is located; and means for successively opening said discharge, suction and supercharging valves during successive compression, suction and compression strokes, respectively, of the piston.

5. An internal combustion engine including a cylinder providing a firing chamber; a piston reciprocable therein; separate discharge, suction and supercharging valves for control of egress from and ingress to the firing chamber; means providing an accumulating chamber for fluid under superatmospheric pressure; means providing separate ways between the firing and accumulating chambers in which said discharge and supercharging valves are located and a way in communication with the atmosphere and said firing chamber in which said suction valve is located; means for successively opening said discharge, suction and supercharging valves during successive compression, suction and compression strokes, respectively, of the piston; and means to introduce combustible fuel into the firing chamber at substantially the completion of said last mentioned compression stroke.

6. An internal combustion engine including a cylinder providing a firing chamber; a piston reciprocable therein; separate discharge, suction and supercharging valves for control of egress from and ingress to said firing chamber; means providing an accumulating chamber for fluid under superatmospheric pressure; means providing separate ways between the firing and accumulating chambers in which said discharge and supercharging valves are located and a way in communication with the atmosphere and said firing chamber in which said suction valve is located; means to open said discharge valve during only a part of a compression stroke of the piston; means to open said suction valve during substantially all of the next succeeding suction stroke and a part of the next succeeding compression stroke; and means to open said supercharging valve during only a part of said last mentioned compression stroke.

7. An internal combustion engine including a cylinder providing a firing chamber; a piston reciprocable therein; separate discharge, suction and supercharging valves for control of egress from and ingress to said firing chamber; means providing an accumulating chamber for fluid under superatmospheric pressure; means providing separate ways between the firing and accumulating chambers in which said discharge and supercharging valves are located and a way in communication with the atmosphere and said firing chamber in which said suction valve is located; means to open said discharge valve during only a part of a compression stroke of the piston; means to open said suction valve during substantially all of the next succeeding suction stroke and a part of the next succeeding compression stroke; means to open said supercharging valve during only a part of said last mentioned compression stroke; and means to introduce combustible fuel into the firing chamber at substantially the completion of said last mentioned compression stroke.

8. In an internal combustion engine including a piston and a cylinder therefor providing a firing chamber and means at the end of the power stroke of the piston for opening the cylinder to the atmosphere for exhaust of waste products of combustion and intake of air; separate discharge, suction and supercharging valves for control of egress from and ingress to the firing chamber; means providing an accumulating chamber for fluid under superatmospheric pressure; means providing separate ways between the firing and accumulating chambers in which said discharge and supercharging valves are located and a way in communication with the atmosphere and said firing chamber in which said supercharging valve is located; and means for successively opening said discharge, suction and supercharging valves during successive compression, suction and compression strokes, respectively, of the piston.

9. In an internal combustion engine including a piston and a cylinder therefor providing a firing chamber and means at the end of the power stroke of the piston for opening the cylinder to the atmosphere for exhaust of waste products of combustion and intake of air; discharge, suction and supercharging valves for control of egress from and ingress to the firing chamber; means providing an accumulating chamber for fluid under superatmospheric pressure; means providing separate ways between the firing and accumulating chambers in which said discharge and supercharging valves are located and a way in communication with the atmosphere and said firing chamber in which said supercharging valve is located; means for successively opening said discharge, suction and supercharging valves during successive compression, suction and compression strokes, respectively, of the piston and means to introduce combustible fuel into the firing chamber at substantially the completion of said last mentioned compression stroke.

10. In an internal combustion engine including a piston and a cylinder therefor providing a firing chamber and means at the end of the power stroke of the piston for opening the cylinder to the atmosphere for exhaust of waste products of combustion and intake of air, a casing providing an accumulating chamber for fluid under superatmospheric pressure having a port for communication with the combustion chamber of the engine, and means for conveying the waste products of combustion from the cylinder at the end of the power stroke in such proximity to said accumulating chamber as to thereby heat the fluid therein.

11. The method of supercharging an internal combustion engine which consists in storing fluid under pressure from a compression stroke of the engine intermediate power and intake strokes, heating the thus compressed fluid, and introducing the thus heated, compressed fluid into the combustion chamber of the engine during a succeeding compression stroke.

12. The method of supercharging an internal combustion engine which consists in storing fluid under pressure from a compression stroke of the engine intermediate power and intake strokes, heating by heat exchange from the exhaust of the engine, the thus compressed fluid, and introducing the thus heated, compressed fluid into the combustion chamber of the engine during a succeeding compression stroke.

13. The method of supercharging an internal combustion engine which consists in storing fluid under pressure from a compression stroke of the engine intermediate power and intake strokes, heating by exhaust of the engine, the thus compressed fluid, and introducing the thus heated, compressed fluid into the combustion chamber of the engine during a succeeding compression stroke.

14. The method of accumulating and heating fluid under superatmospheric pressure which consists in entrapping at least some of the fluid compressed by an internal combustion engine during the compression stroke intermediate the power and intake strokes thereof and heating the thus entrapped fluid by heat exchange from the waste products of combustion of the engine.

WALTER P. RUSS.